US009058060B2

(12) United States Patent
Kuo

(10) Patent No.: US 9,058,060 B2
(45) Date of Patent: Jun. 16, 2015

(54) KEYBOARD MODULE AND METHOD FOR FABRICATING THE SAME

(75) Inventor: Yan-Lin Kuo, Taipei Hsien (TW)

(73) Assignee: ACER INCORPORATED, Taipei Hsien (TW)

(*) Notice: Subject to any disclaimer, the term of this patent is extended or adjusted under 35 U.S.C. 154(b) by 390 days.

(21) Appl. No.: 13/425,290

(22) Filed: Mar. 20, 2012

(65) Prior Publication Data

US 2013/0098743 A1   Apr. 25, 2013

(30) Foreign Application Priority Data

Oct. 19, 2011 (TW) .............................. 100137830 A

(51) Int. Cl.
*H01H 13/00* (2006.01)
*H01H 13/12* (2006.01)
*G06F 3/02* (2006.01)
*H01H 13/705* (2006.01)

(52) U.S. Cl.
CPC ......... *G06F 3/0221* (2013.01); *Y10T 29/49105* (2015.01); *H01H 13/705* (2013.01)

(58) Field of Classification Search
CPC .............. H01H 13/702; H01H 13/705; H01H 13/7065; H01H 13/7073
USPC .................. 200/5 A, 520, 521, 341, 344, 345
See application file for complete search history.

(56) References Cited

U.S. PATENT DOCUMENTS

| 5,912,443 | A * | 6/1999 | Hasunuma ..................... 200/5 A |
| 7,312,414 | B2  | 12/2007 | Yatsu et al. |
| 2009/0038922 | A1* | 2/2009 | Wang ............................. 200/344 |
| 2010/0007609 | A1  | 1/2010 | Watabe et al. |
| 2011/0155550 | A1* | 6/2011 | Ouyang ......................... 200/345 |

FOREIGN PATENT DOCUMENTS

| JP | 3099586 | 10/2000 |
| JP | 3161452 | 4/2001 |
| JP | 2007-102613 | 4/2007 |
| JP | 2007-188682 | 7/2007 |
| JP | 2010-020574 | 1/2010 |
| JP | 2010-170359 | 8/2010 |
| KR | 10-2007-0119976 | 12/2007 |

OTHER PUBLICATIONS

Korean Office Action dated Aug. 22, 2013.
English language translation of abstract of KR 10-2007-0119976 (published Dec. 21, 2007).

(Continued)

*Primary Examiner* — Felix O Figueroa
(74) *Attorney, Agent, or Firm* — McClure, Qualey & Rodack, LLP

(57) ABSTRACT

A keyboard module includes a base, a plurality of retaining members and a plurality of keycaps. Each of the retaining members includes a bottom portion, a bending portion and an upper portion. The bottom portion is disposed on the base. The bending portion is connected to the bottom portion and extends along a direction away from the bottom portion. The upper portion is connected to the bending portion. The keycaps are respectively disposed on one of the upper portions corresponding thereto. After the keycaps are pressed by an external force, the upper portions are abutted by the keycaps, and the bending portion is deformed.

8 Claims, 7 Drawing Sheets

(56) References Cited

OTHER PUBLICATIONS

English language translation of abstract of JP 2010-170359 (published Aug. 5, 2010).
Japanese language office action dated Dec. 3, 2013.
English language translation of abstract of JP 3099586 (published Oct. 16, 2000).
English language translation of abstract of JP 3161452 (published Apr. 25, 2001).
English language translation of abstract of JP 2007-102613 (published Apr. 19, 2007).
English language translation of abstract of JP 2007-188682 (published Jul. 26, 2007).
English language translation of abstract of JP 2010-020574 (published Jan. 28, 2010).

\* cited by examiner

KEYBOARD MODULE AND METHOD FOR FABRICATING THE SAME

CROSS REFERENCE TO RELATED APPLICATIONS

This application claims priority of Taiwan Patent Application No. 100137830, filed on Oct. 19, 2010, the entirety of which is incorporated by reference herein.

BACKGROUND OF THE INVENTION

1. Field of the Invention

The present invention relates to a keyboard module, and in particular relates to a slim keyboard module.

2. Description of the Related Art

A keyboard is commonly used for nearly every electronic device, such as a portable personal computer. Since size reduction is a trend for the portable personal computer, every element disposed in the portable personal computer must be flat and light. However, a significant portion of the thickness and weight of the portable personal computer resides in the keyboard.

Please refer to FIG. 1, a conventional keyboard module 1 is shown in FIG. 1. The conventional keyboard module 1 comprises a cap 10, two posts 20 and 30, a button base 40, and a rubber member 50. The two posts 20 and 30 pivot to each other in a scissors-like manner. Each end of the two posts 20 and 30 has a circular protrusion 21 and 31, and the cap 10 and the button base 40 have its own bores 11 and 41, wherein the circular protrusions 21 and 31 are received in the bores 11 and 41. Therefore, the cap 10 is supported on the button base 40 by the posts 20 and 30, and the cap 10 is allowed to move vertically relative to the button base 40. When an external force is applied on the cap 10, the cap 10 may statically move relative to the button base. After the external force is no longer applied on the cap 10, the rubber member 50 provides a restoring force to restore the cap 10 to its original position.

However, such a scissors-like mechanism requires combining many components which complicates assembly operations and is hinders the requirement of a thin electronic device.

BRIEF SUMMARY OF THE INVENTION

In this regard, the main objective of the invention is to provide a thinner keyboard module, so that the thickness of an end use product applying the keyboard module can be diminished. The other objective of the invention is to reduce the necessary elements of the keyboard module so as to simplify assembly operations and decrease manufacturing costs.

To achieve the above objectives, the present invention provides a keyboard module, which includes: a base, a plurality of retaining members and a plurality of keycaps. Each of the retaining members includes a bottom portion, a bending portion and an upper portion. The bottom portion is disposed on the base. The bending portion is connected to the bottom portion and extends along a direction away from the bottom portion. The upper portion is connected to the bending portion. The keycaps are respectively disposed on one of the upper portions corresponding thereto. After the keycap is pressed by an external force, the upper portion is abutted by the keycap, and the bending portion is deformed.

The other objective of the invention is to provide a method for fabricating above mentioned keyboard module. The method includes: providing a membrane; disposing a plurality of resilient members on the membrane; disposing a plurality of retaining members corresponding to the resilient members on the membrane; and connecting the membrane, along with the resilient members, the keycaps and the retaining members, to a circuit board.

Thus, the number of necessary elements of the above mentioned keyboard module may be remarkably reduced. Additionally, due to the planar structural features of the keyboard module, the moving profile of the keycaps is reduced whereby the thickness thereof becomes less. Moreover, thanks to the feed back force produced by the retaining members, the keycaps can be kept balanced while being pressed and a comfortable feeling may be felt by a user while the user strikes the keycaps.

BRIEF DESCRIPTION OF THE DRAWINGS

The present invention is more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 2:
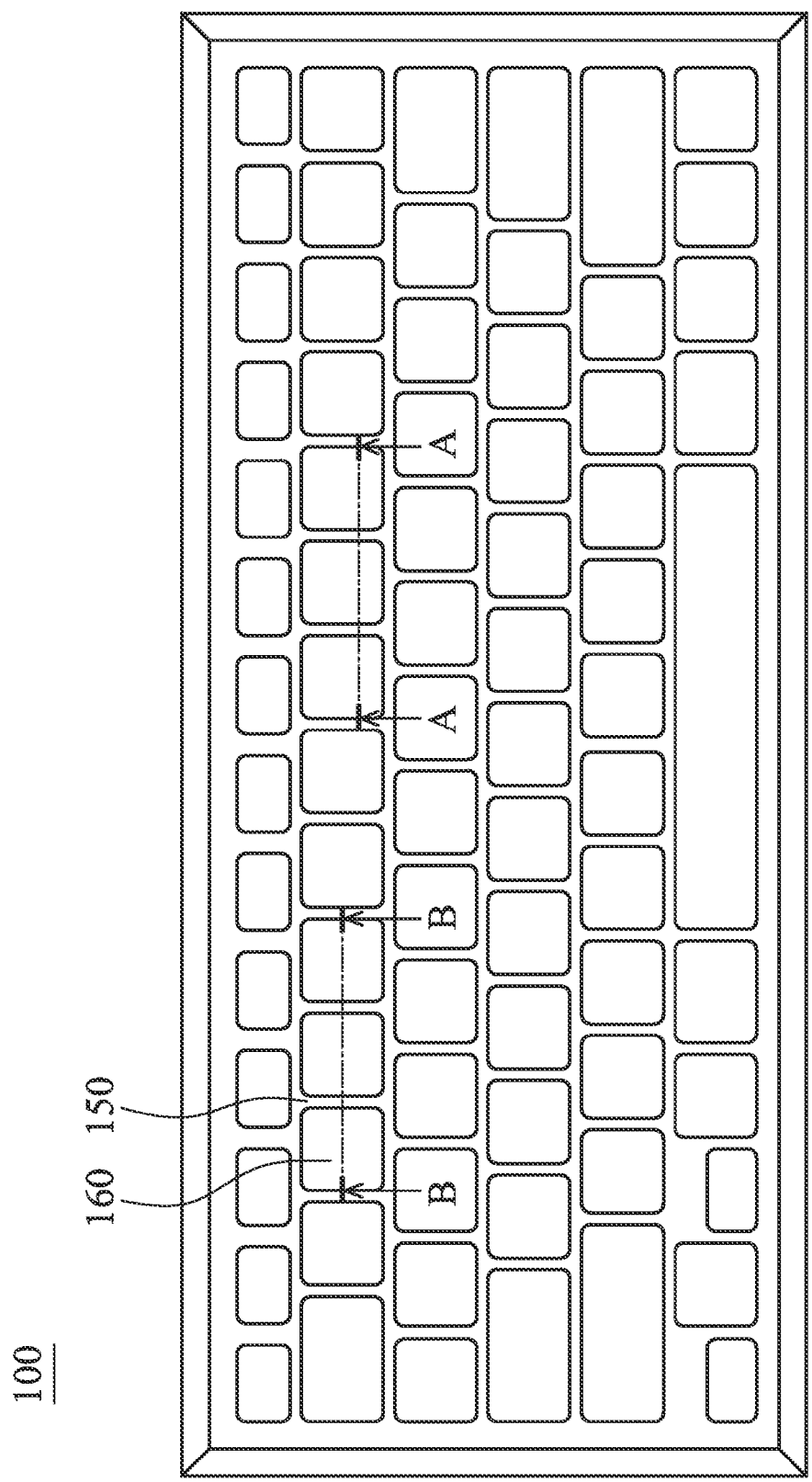
FIG. 2 illustrates a top view of a keyboard module of a preferred embodiment of the invention.
Figure 4A:
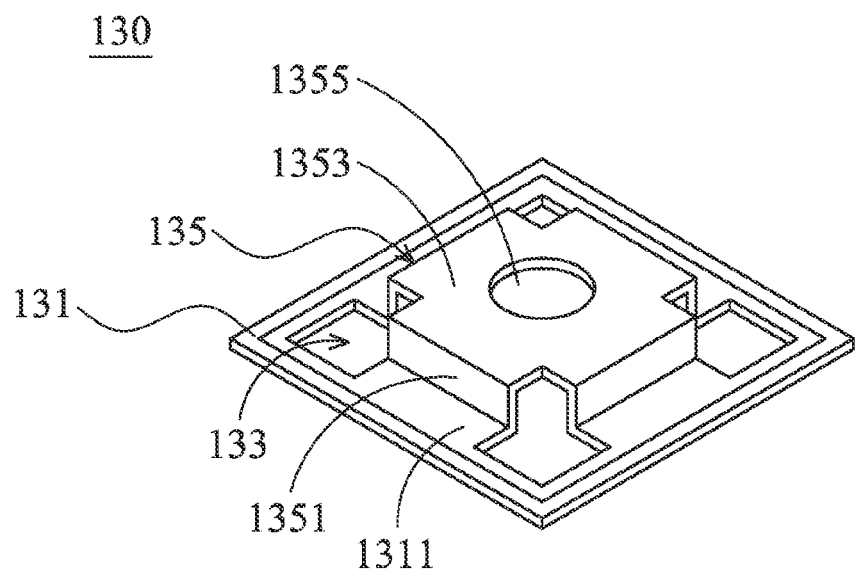
FIG. 4A illustrates a schematic view of the retaining member of FIG. 3.
Figure 4B:
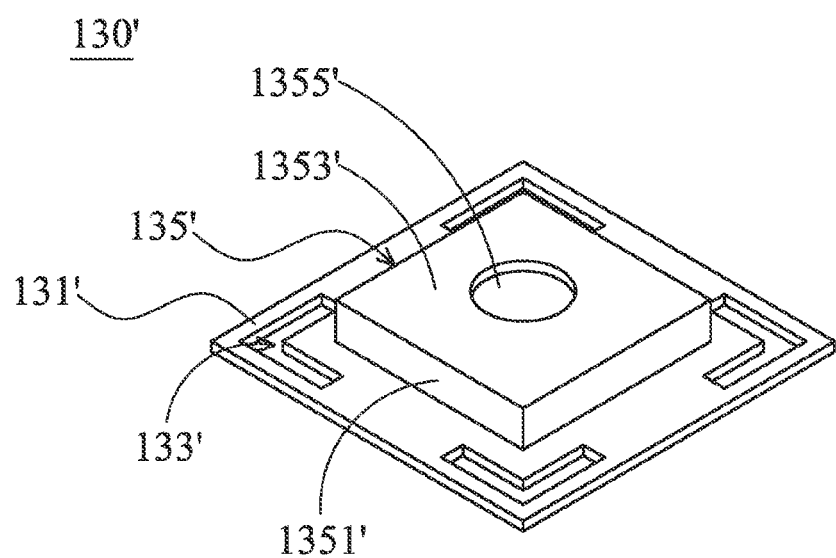
FIG. 4B illustrates a schematic view of a retaining member of another embodiment of the invention.
Figure 5:
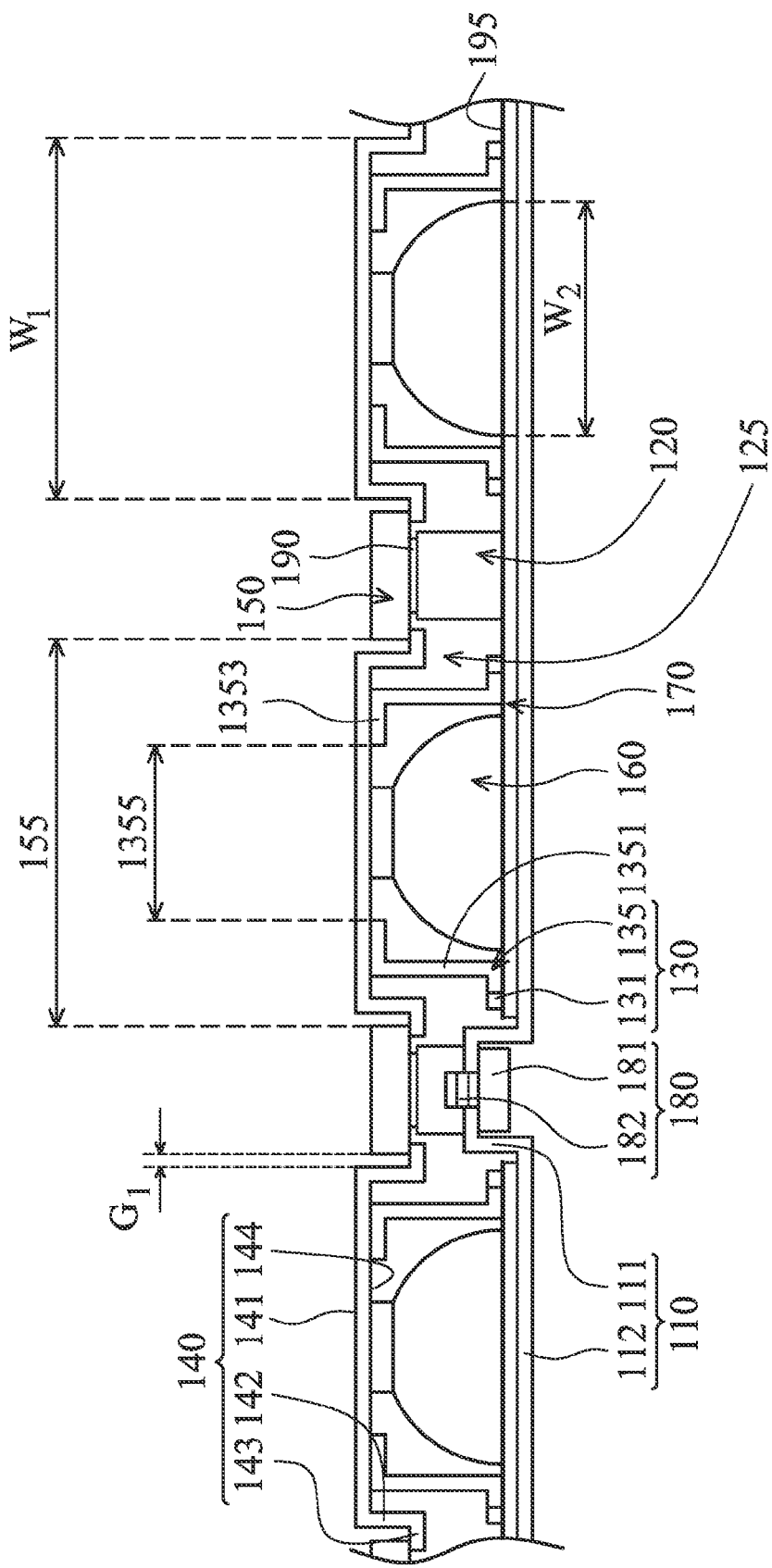
FIG. 5 is a cross-sectional view of the keyboard module in accordance with the preferred embodiment of the invention, with a keycap not being pressed.
Figure 6:
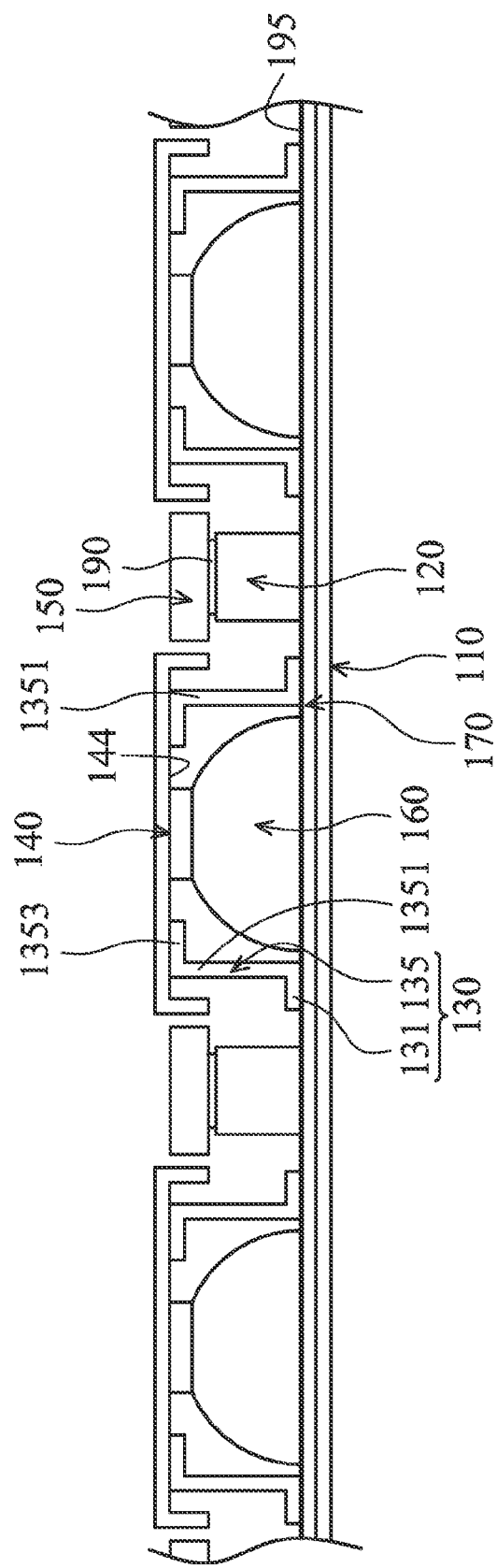
FIG. 6 is a cross-sectional view of the keyboard module of the preferred embodiment of the invention taken along line B-B of FIG. 2.

Please refer to FIGS. 2-6, wherein FIG. 5 is a cross-sectional view taken along line A-A of FIG. 2, and FIG. 6 is a cross-sectional view taken along line B-B of FIG. 2. To simplify the drawings, in FIG. 3, only partial structures of the elements 110, 120, 150 and 170 are shown.

In a preferred embodiment of the invention, the keyboard module 100 includes a base 110, a supporting frame 120, a plurality of retaining members 130, a plurality of keycaps 140, a front frame 150, a plurality of resilient members 160, a circuit board 170 and a plurality of bolts 180. The base 110 includes at least one recess 111 and a plate 112. The recess 111, embossed from a surface of the plate 112, has a bolt hole 111a.

A plurality of openings 125 are formed at the supporting frame 120. In an exemplary embodiment, the supporting frame 120 is disposed on the base 110 by bolting, wherein the extension part 182 of each bolt 180 passes through the bolt hole 111a and is connected to the supporting frame 120, and the head portion 181 of the bolt 180 is disposed in the recess 111 (FIG. 5) to further diminish the thickness of the keyboard module 100. However, the connection mechanism of the base 110 and the supporting frame 120 should not be limited thereto. For example, the supporting frame 120 can be fixed on the base 110 by a thermal setting.

The retaining members 130 are disposed in the openings 125 of the supporting frame 120. The retaining members 130 are deformable elements whereby once an external forced is applied thereon, the retaining member 130 deforms and rebounds to its original shape after the external force is removed. In an exemplary embodiment, the retaining members 130 are soft pads made of silicon material, but it should not be limited thereto.

Please refer to FIGS. 4A and 5. Each of the retaining members 130 includes a bottom portion 131, four through holes 133 and a restrained unit 135. The bottom portion 131 is connected to the circuit board 170 (the details of the assembly operations of the bottom portion 131 and the circuit board 170 will be described later) and includes four rib portions 1311 extending inwardly. The restrained unit 135 is disposed substantially at the center of the bottom portion 131 and extends from the bottom portion 131 to support the keycap 140. Specifically, each of the restrained unit 135 includes four bending portions 1351, an upper portion 1353 and an opening 1355. The four bending portions 1351 are respectively connected to the rib portions 1311 and extend along a direction away from the base 110. The upper portions 1353 are connected to the distal ends of the four bending portions 1351, and the opening 1355 is disposed substantially at the center of the upper portion 1353. The four through holes 133 are respectively disposed between each two of the bending portions 1351 and between each two of the rib portions 1311. That is, the four through holes 133 are formed at four corners of the retaining member 130.

Please refer to FIG. 4B. The structural features of the retaining member should not be limited to the above embodiment. In other embodiments, each of the retaining members 130' includes a bottom portion 131', four through holes 133' and a restrained unit 135'. The restrained unit 135' is disposed substantially at the center of the bottom portion 131' and includes a bending portion 1351', an upper portion 1353' and an opening 1355'. The bending portion 1351' extends along a direction away from the base 110. The upper portion 1353' is connected to the distal end of the bending portion 1351', and the opening 1355' is disposed substantially at the center of the upper portion 1353'. The four through holes 133 are formed at four corners of the bottom portion 131'

Figure 3:
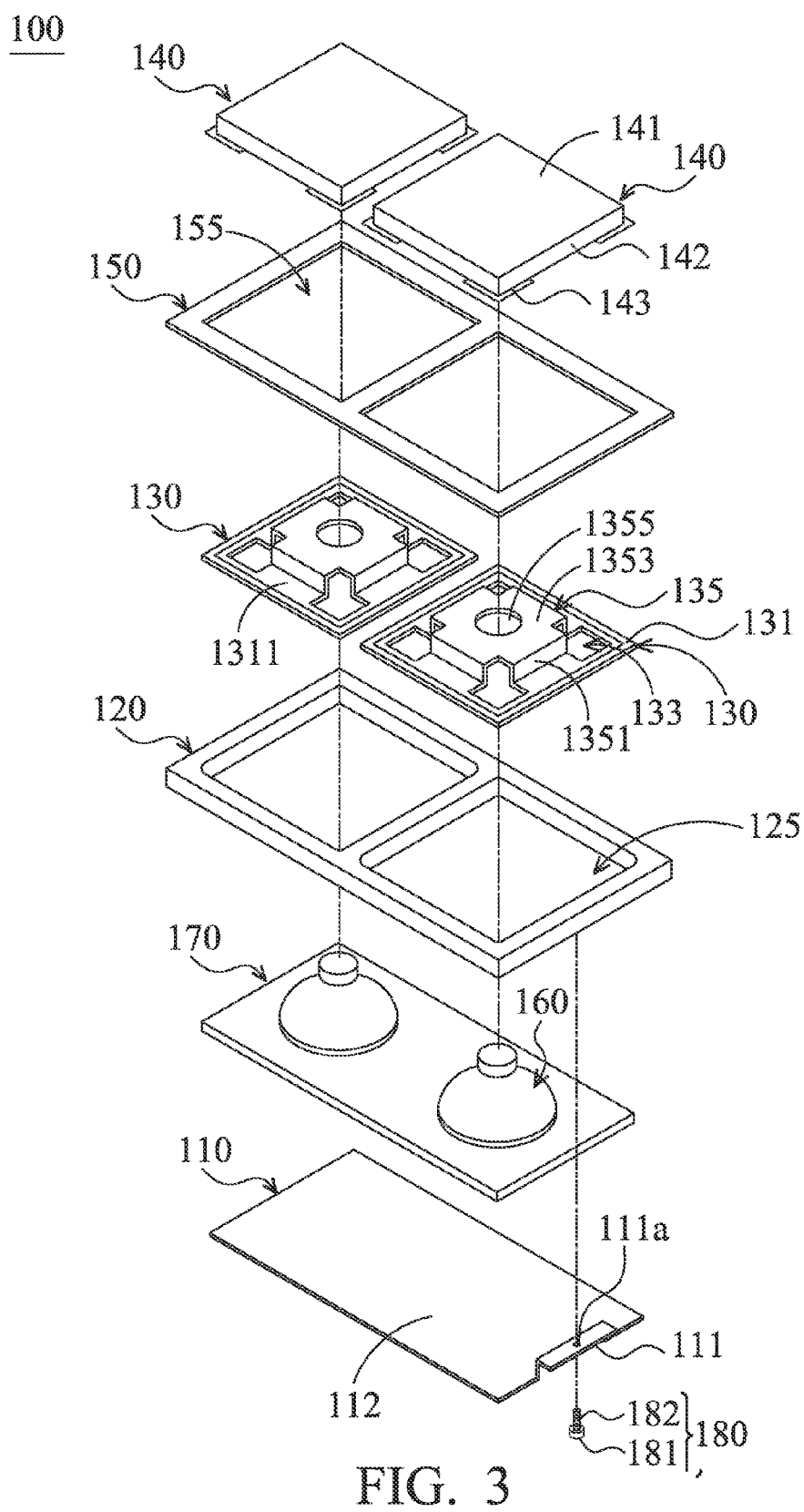
FIG. 3 illustrates a partial exploded view of the keyboard module of the preferred embodiment of the invention.

Please refer to FIGS. 3 and 5. The keycap 140 has a width $W_1$ and includes a pressing surface 141, a flange 142, a bottom surface 144 and four maintaining wings 143. The flange 142 surrounds the pressing surface 141 and extends along a direction away from the pressing surface 141. The maintaining wings 143 are disposed at the four corners of the flange 142 and extend outwardly.

The bottom surface 144, opposite to the pressing surface 141, is connected to the upper portion 1353. In one exemplary embodiment, the retaining member 130 and the keycap 140 are formed integrally (the fabricating method thereof is illustrated later), but it should not be limited thereto. In other embodiments, the keycaps 140 and the retaining member 130 are bonded together by glue.

The front frame 150 is disposed on the supporting frame 120. In one exemplary embodiment, as shown in FIG. 5, the bottom surface of the front frame 150 is connected to the upper surface of the supporting frame 120 via glue 190. A plurality of openings 155 are formed at the front frame 150, wherein each of the openings 155 corresponds to one of the openings 125 of the supporting frame 120, respectively. The keycaps 140 are disposed in the openings 155, wherein the maintaining wings 143 of the keycaps 140 are connected to the bottom surface of the front frame 150 and a first gap $G_1$ is formed between the supporting frame 120 and the flange 142 of each of the keycaps 140. In one exemplary embodiment, to achieve the object of making a thinner keyboard, the front frame 150 is made of a metal which has outstanding extensibility so as to diminish the thickness of the front frame 150.

The resilient members 160, having a width $W_2$ (FIG. 5), are disposed in the retaining members 130 and disposed on the circuit board 170. Specifically, each of the resilient members 160 is disposed among four bending portions 1351 and passes through the opening 1355 so as to connect to the bottom surface 144 of the keycap 140. In one exemplary embodiment, the resilient members 160 are made of a rubber material, but it should not be limited thereto. Any material which is capable of reshaping to an original shape after the compression is removed, can be applied as the resilient member of the invention The circuit board 170 is disposed on the plate 111 of the base 110. In this embodiment, the circuit board 170 is a flexible print circuit board which detects a pressing force and produces a signal.

Please refer to FIG. 5. A method for fabricating the keyboard module 100 includes: providing a membrane 195 (such as PET); disposing a plurality of resilient members 160 on the membrane 195; disposing a plurality of retaining members 130 corresponding to each of the resilient members 160; connecting the membrane 195, along with the resilient members 160 and the retaining members 130, to a circuit board 170; and assembling the base 110, the supporting frame 120, the front frame 150 and the keycaps 140.

The fabricating method, in the other embodiments, for the above mentioned keyboard module 100 includes: providing a membrane 195 (such as PET); forming a plurality of resilient members 160 on the membrane 195; forming a keycap 140 on each of the retaining members 130 by double-injection molding techniques; disposing the retaining members 130 and the keycaps 140 to each of the corresponding resilient members 160 on the membrane 195, wherein the retaining members 130 and the keycaps 140 are formed integrally; connecting the membrane 195, along with the retaining members 130, the keycaps 140 and the resilient members 160, to a circuit board 170; and assembling the base 110, the supporting frame 120 and the front frame 150.

The operational method of the keyboard module 100 is illustrated as follows. Please refer to FIGS. 5 and 7. FIG. 5 is a cross-sectional view of the keyboard module 100 of the preferred embodiment of the invention before the keycap being pressed, and FIG. 7 is a cross-sectional view of the keyboard module 100 of the preferred embodiment of the invention with the keycap being pressed.

Before the keycaps 140 are pressed, the keycaps 140 are supported by the retaining members 130 and the resilient members 160, wherein due to the mechanical strength of the retaining members 130, the bottom surfaces 144 of the keycaps 140 are supported by the upper portions 1353 of the retaining members 130. Thus, the keycaps 140 can always be balanced.

Figure 7:
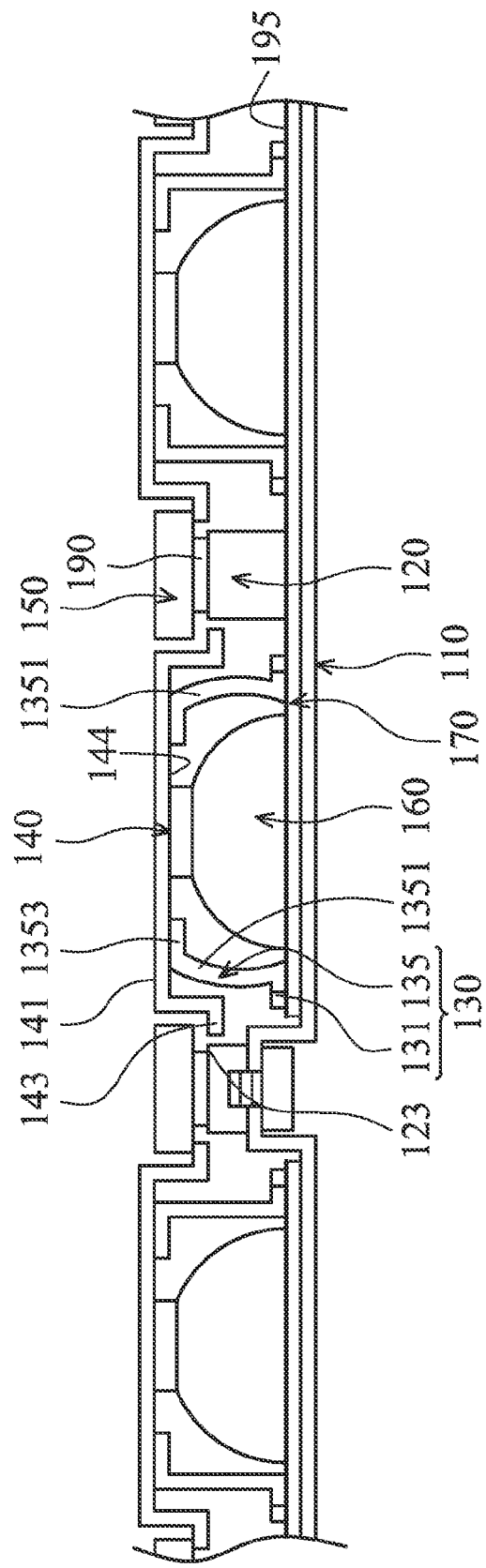
FIG. 7 is a cross-sectional view of the keyboard module of the preferred embodiment of the invention with the keycap being pressed.

Please refer to FIG. 7. Once the pressing surface 141 of one of the keycaps 140 is pressed by an external force, the upper portion 1353 of the retaining member 130 is evenly abutted by the bottom surface 144 of the keycap 140, and the bending portions 1351 are deformed. At the same time, the resilient member 160 is deformed downwardly to actuate the circuit board 170 producing a signal.

Because the force from the keycap 140 is evenly distributed by the upper portion 1353, the keycap 140 can be kept balanced while moving. On the other hand, a touched feeling, provided by the force feedback of the resilient member 160, can be felt by the user. Therefore, the user will not feel exhausted after a long time using of the keycap 140. Additionally, the necessary force for pressing the keycap 140 is reduced due to the arrangement of the through holes 133 which are formed at the four corners of the opening 1355.

Once the pressing surface 141 is not pressed by the external force, a resilient force is provided by the retaining member 130 and the resilient member 160 so as to allow the keycap 140 to return to the state as shown in FIG. 5. The resilient force produced by the retaining member 130 and the resilient member 160 may cause the keycap 140 to separate therefrom. To prevent this, a pull-back force is provided by the maintaining wings 143 which are connected to the bottom of the front frame 150, wherein the pull-back force equals to the torque having magnitude of the first gap $G_1$ times the resilient force, produced by the retaining member 130 and the resilient member 160.

Figure 1:
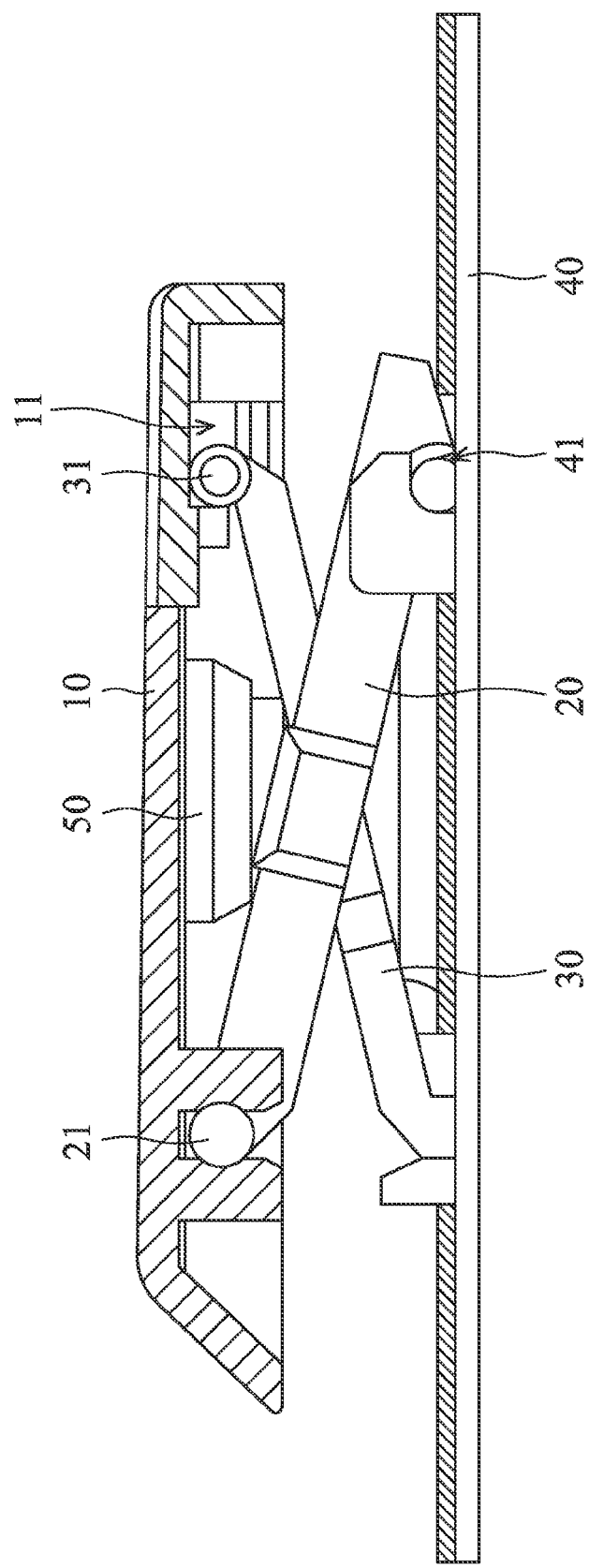
FIG. 1 illustrates a cross-sectional view of a conventional keyboard module.

Please refer to FIGS. 1 and 5. On the other hand, due to the mechanical structures under the keycaps, the volume of the rubber member 50 of the conventional keyboard module 1 (FIG. 1) is limited. However, the life time of the keyboard module 1 is directly determined by the volume of the rubber member 50, because once the rubber member 50 is fatigued, the keycap 10 can't rebound to its original position. On the contrary, the keyboard module 100, different from the conventional one, does not include a supporting frame 30 which is disposed between the base 110 and the keycap 140. Thus, the space for receiving the resilient member 160 is increased. In one exemplary embodiment, the width $W_1$ of the resilient members 160 is equal to or larger than 80 percent of the width $W_2$ of the keycaps 140. Thus, the lifetime of the resilient member 160 is increased remarkably.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A keyboard module, comprising:
   a base;
   a plurality of retaining members, respectively comprising:
   a bottom portion, disposed on the base,
   a bending portion, connected to the bottom portion and extending along a direction away from the bottom portion, and
   an upper portion, connected to the bending portion;
   a plurality of keycaps, respectively disposed on one of the upper portions corresponding thereto; and
   a plurality of resilient members, wherein each of the resilient member is directly contact with one of the keycaps,
   wherein after the keycaps are pressed by an external force, the upper portions are abutted by the keycaps, and the bending portions are deformed;
   wherein an opening is formed on the upper portion of each of the retaining members, wherein each of the resilient members is disposed in a space defined by the bending portion and the upper portion of one of the retaining members and passes through the corresponding opening to contact with the corresponding keycap.

2. The keyboard module as claimed in claim 1, wherein each of the resilient members has a first width, and each of the keycaps has a second width, wherein the first width is equal to or larger than 80 percent of the second width.

3. The keyboard module as claimed in claim 1 further comprising a membrane, wherein the resilient members and the retaining members are disposed on the membrane.

4. The keyboard module as claimed in claim 1, wherein at least one of the retaining members comprises a plurality of the bending portions, and the bottom portion of the at least one of the retaining members comprises a plurality of rib portions, wherein each of the rib portions extends inwardly and connects to one of the bending portions.

5. The keyboard module as claimed in claim 4, wherein each of the retaining members comprises a plurality of through holes formed between each two of the rib portions and between each two of the bending portions.

6. The keyboard module as claimed in claim 5, wherein the through holes are disposed on four corners of each of the retaining members.

7. The keyboard module as claimed in claim 1 further comprising:
   a supporting frame, and
   a front frame, connected to the supporting frame,
   wherein the supporting frame and the front frame respectively comprises a plurality of openings, wherein the openings of the supporting frame correspond to the openings of the front frame respectively, and the keycaps and the retaining members are disposed in the openings of the supporting frame and the front frame.

8. The keyboard module as claimed in claim 7, wherein each of the keycaps comprises a plurality of maintaining wings, outwardly extending and connected to a bottom surface of the front frame which is connected to the supporting frame.

* * * * *